US008726957B2

(12) United States Patent
Ibaraki

(10) Patent No.: US 8,726,957 B2
(45) Date of Patent: May 20, 2014

(54) PNEUMATIC TIRE HAVING BRANCHED EXTENSION BLOCKS

(75) Inventor: Daisuke Ibaraki, Osaka (JP)

(73) Assignee: Toyo Tire & Rubber Co., Ltd., Osaka-shi ( * ) Notice: Subject to any disclaimer, the term of this patent is extended or adjusted under 35 U.S.C. 154(b) by 1677 days.

(21) Appl. No.: 11/334,212

(22) Filed: Jan. 18, 2006

(65) Prior Publication Data

US 2006/0157178 A1 Jul. 20, 2006

(30) Foreign Application Priority Data

Jan. 19, 2005 (JP) ................................. 2005-011700

(51) Int. Cl.
*B60C 11/01* (2006.01)
(52) U.S. Cl.
USPC ...................................... 152/209.16; 152/523
(58) Field of Classification Search
USPC .............................. 152/209.16, 523; D12/605
See application file for complete search history.

(56) References Cited

U.S. PATENT DOCUMENTS

| 917,612 | A | * | 4/1909 | Kempshall | ............... | 152/209.16 |
| D62,972 | S | * | 8/1923 | Wolfe | ............... | D12/577 |
| D380,717 | S | * | 7/1997 | Rohweder et al. | ............ | D12/588 |
| D455,986 | S | * | 4/2002 | Allison | .......... | D12/584 |
| 6,533,007 | B1 | * | 3/2003 | McMannis | ............... | 152/209.16 |
| D488,769 | S | * | 4/2004 | Guidry | .......... | D12/579 |
| D500,286 | S | * | 12/2004 | Leynaert et al. | ............. | D12/605 |
| D516,016 | S | * | 2/2006 | Miyazaki et al. | ............. | D12/605 |
| D517,004 | S | * | 3/2006 | Miyazaki et al. | ............. | D12/605 |
| D521,444 | S | * | 5/2006 | Miyazaki et al. | ............. | D12/605 |
| D531,110 | S | * | 10/2006 | Miyazaki et al. | ............. | D12/579 |
| D536,664 | S | * | 2/2007 | Miyazaki et al. | ............. | D12/605 |
| D539,214 | S | * | 3/2007 | Miyazaki | ..................... | D12/605 |
| 7,464,739 | B2 | * | 12/2008 | Ibaraki | ........................ | 152/523 |
| 7,490,647 | B2 | * | 2/2009 | Ibaraki | ........................ | 152/523 |
| 2004/0003881 | A1 | | 1/2004 | Ebiko | | |
| 2005/0103416 | A1 | * | 5/2005 | Rooney et al. | ........... | 152/209.16 |

FOREIGN PATENT DOCUMENTS

| AT | 397373 B | 3/1994 |
| DE | 1 756 749 A | 4/1970 |

(Continued)

OTHER PUBLICATIONS

Machine translation for Japan 08-034206 (no date).*

(Continued)

*Primary Examiner* — Steven D Maki
(74) *Attorney, Agent, or Firm* — Knobbe Martens Olson & Bear LLP

(57) ABSTRACT

A pneumatic tire comprises a pair of bead portions, a sidewall portion extending from the bead portions outward in a radial direction of the tire, a tread portion connected to an outer side of the sidewall portion in the radial direction of the tire through a shoulder portion, and extension block groups in each of which a plurality of extension blocks to extending from at least the shoulder portion to the sidewall portion are arranged in a circumferential direction of the tire. The extension block group includes a first extension block whose cross section height from a tire equator point exceeds ½ of a tire cross section height, and a second extension block whose cross section height from the tire equator point is lower than the first extension block.

8 Claims, 3 Drawing Sheets

(56) References Cited

FOREIGN PATENT DOCUMENTS

| | | | |
|---|---|---|---|
| DE | 699 01 908 T2 | | 2/2003 |
| EP | 1 107 872 B1 | | 6/2002 |
| JP | 3-31008 A | | 2/1991 |
| JP | 08-034206 | * | 2/1996 |
| JP | 8-197917 | | 8/1996 |
| JP | 11-291718 | | 10/1999 |
| JP | 2000-16031 A | | 1/2000 |

OTHER PUBLICATIONS

Gerrman Office Action dated Sep. 8, 2009, couterpart of German Patent Application No. 10 2006 002 455.0-16.

* cited by examiner

PNEUMATIC TIRE HAVING BRANCHED EXTENSION BLOCKS

BACKGROUND OF THE INVENTION

1. Field of the Invention

The present invention relates to a pneumatic tire capable of reinforcing a sidewall portion and enhancing durability, steering stability and noise reduction ability.

2. Description of the Related Art

As shown in FIG. 5, a pneumatic tire usually includes a pair of annular bead portions 1, sidewall portions 2 extending from the respective bead portions 1 radially outward of the tire, and tread portions 4 connected to the respective sidewall portions 2 radially outward of the tire through a shoulder portion 3. A carcass ply 5 forming a tire frame is disposed such as to extend between the bead portions 1. The sidewall portion 2 is largely bent during running of a vehicle, but its thickness is relatively small, and there is a tendency that the durability, the steering stability and the noise reduction ability are deteriorated. To enhance them, it is preferable that the sidewall portion 2 is reinforced, but even if the rubber hardness is enhanced, the obtained effect is limited.

Hence, Japanese Patent Application Laid-open No. H8-197917 discloses a pneumatic tire in which the sidewall portion is provided with a plurality of ribs extending in an inclined direction with respect to a circumferential direction of the tire. According to the pneumatic tire, the sidewall portion can be reinforced over the substantially entire region of its cross section height. However, since a design of keynote of the outer surface of the sidewall portion is different from that of the tread surface, discontinuous portion of the reinforced region is generated in the vicinity of the shoulder portion in some cases, and the durability may be deteriorated in this discontinuous portion in some cases. If the sidewall portion is reinforced, the vibration can be suppressed and noise can be reduced, but frequency band of suppressed vibration is relatively narrow, and reduction effect of road noise is poor.

Japanese Patent Application Laid-open No. H11-291718 discloses a pneumatic tire in which a concave block extending from the shoulder portion to the sidewall portion is disposed in the circumferential direction of the tire. According to such a pneumatic tire, since a cross section height of the concave block from the tire equator point is set ½ or less of the tire cross section height, it is not possible to reinforce a thin portion of the sidewall portion exceeding ½ of the tire cross section height, and the effect for enhancing the durability is poor. Further, since the cross section height of the concave block is uniform, there is a problem that an interface of the reinforced region is formed along the circumferential direction of the tire and a crack is prone to be generated along the circumferential direction of the tire due to the sidewall portion is bent. Similarly, since the frequency band of vibration to be suppressed by the reinforcing is relatively narrow, the effect for reducing the road noise is poor.

Japanese Patent Application Laid-open No. 2000-16031 discloses a pneumatic tire in which an inclined groove extending in a direction which is inclined with respect to the circumferential direction of the tire is extended to a lower region of the sidewall portion. However, this structure is for overcoming outer appearance inconvenience of the tire, and is not for reinforcing the sidewall portion.

SUMMARY OF THE INVENTION

The present invention has been accomplished in view of the above circumstances, and it is an object of the invention to provide a pneumatic tire capable of reinforcing a sidewall portion and enhancing durability and steering stability, and capable of suppressing vibration in wide frequency band and enhancing the noise reduction ability.

The object can be achieved by the present invention having the following structure. That is, the invention provides a pneumatic tire comprising a pair of bead portions, a sidewall portion extending from the bead portions outward in a radial direction of the tire, a tread portion connected to an outer side of the sidewall portion in the radial direction of the tire through a shoulder portion, and extension block groups in each of which a plurality of extension blocks extending from at least the shoulder portion to the sidewall portion are arranged in a circumferential direction of the tire, wherein the extension block group includes a first extension block whose cross section height from a tire equator point exceeds ½ of a tire cross section height, and a second extension block whose cross section height from the tire equator point is lower than the first extension block.

According to the structure of the invention, since the pneumatic tire includes the extension block groups in each of which the plurality of extension blocks extending from at least the shoulder portion to the sidewall portion are arranged in the circumferential direction of the tire, it is possible to reinforce the sidewall portion without generating a discontinuous portion of reinforced region in the vicinity of the shoulder portion. Since the extension block group includes the first extension block whose cross section height from the tire equator point exceeds ½ of the tire cross section height, a thin portion of the sidewall portion exceeding ½ of the tire cross section height is reinforced, and the sidewall portion can be reinforced over the substantially entire region of the cross section height. Further, since the second extension block has a different cross section height from that of the first extension block, the interface of the reinforced region is inclined with respect to the circumferential direction of the tire and thus, a crack extending along the circumferential direction of the tire can be suppressed, and durability can be secured. Further, since the extension block group comprises a plurality of the extension blocks having different cross section heights, it is possible to suppress vibration in the direction of the cross section height of relatively wide frequency band from low frequency to high frequency, and the road noise can effectively be reduced.

In the above structure, it is preferable that land heights of the extension blocks constituting the extension block group are gradually reduced from the shoulder portion toward the sidewall portion. With this, difference in rigidity in the interface of the reinforced region is reduced, and durability and the steering stability can effectively be enhanced.

In the above structure, it is preferable that when one of the extension blocks constituting the extension block group which has the highest cross section height from the tire equator point is defined as a longest block, a ratio of cross section height of the extension blocks from an intersection point P between the tire surface and a contour extension line at the radius of curvature which appears on a groove bottom surface of the tread portion to a cross section height of the second extension block with respect to the longest block from the intersection point P is 20% or more. With this, reinforcing effect of the sidewall portion can be secured by the second extension block.

In the above structure, it is preferable that the extension block group includes an extension block whose cross section height from the tire equator point does not exceed ½ of a tire cross section height. With this, the extension block whose cross section height exceeds ½ of the tire cross section height and the extension block whose cross section height does not exceed ½ of the tire cross section height are mixed, vibration in the cross section height direction can be suppressed in relatively wide frequency band, and the road noise can be reduced.

In the above structure, it is preferable that tip ends of the extension blocks constituting the extension block group are tapered. With this, the rigidity is not excessively increased in a region where the tip end of the extension block and the bead filler are superposed in the thickness direction of the tire.

DESCRIPTION OF THE PREFERRED EXAMPLES

Figure 1:
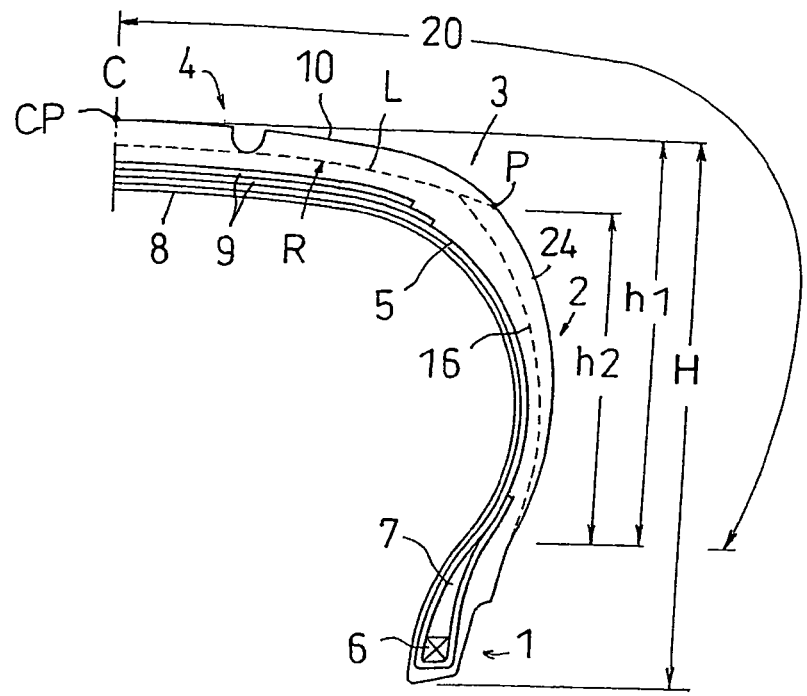
FIG. 1 is a semi-sectional view showing one example of a pneumatic tire of the present invention.
Figure 2:
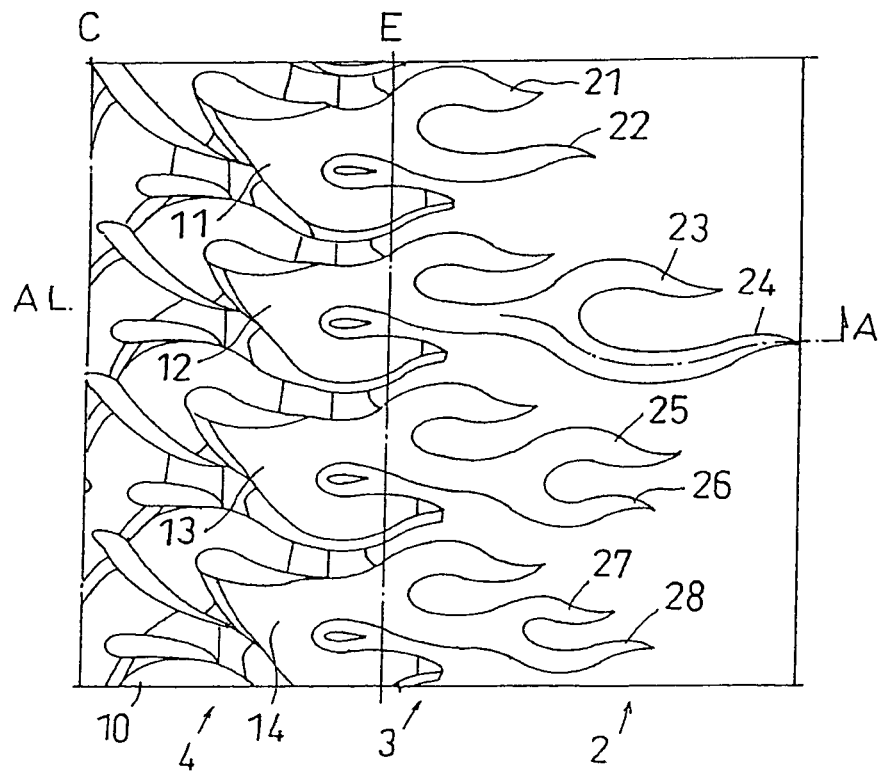
FIG. 2 is a developed plan view of an outer peripheral surface of the tire.

An embodiment of the present invention will be explained with reference to the drawings. FIG. 1 is a semi-sectional view showing one example of a pneumatic tire according to the present invention. FIG. 2 is a developed plan view of an outer peripheral surface of the tire in a range shown with a symbol 20 in FIG. 1. FIG. 1 is a sectional view taken along the line A-A in FIG. 2, dotted line 16 shows an outer peripheral surface of the sidewall portion 2 where an extension block is not formed. The extension block will be described later.

In FIG. 1, the land height of extension block 24 is represented by the distance between the dotted line 16, where no extension block is formed and the top of extension block 24. As can be seen in this Figure, this land height is gradually reduced from the shoulder portion 3 to the sidewall portion 2 continuously.

As shown in FIG. 1, the pneumatic tire of the present invention includes a pair of annular bead portions 1, sidewall portions 2 extending from respective bead portions 1 radially outward of the tire, and tread portions 4 connected to the respective sidewall portions 2 radially outward of the tire through a shoulder portion 3. In the bead portion 1, an annular bead 6 formed by coating a convergence body of steel wire with rubber, and a bead filler 7 made of hard rubber disposed outside of the bead 6 in the circumferential direction of the tire. The bead filler 7 has substantially triangular cross section.

The carcass ply 5 comprises ply cords arranged at a predetermined angle with respect to the circumferential direction of the tire, and is disposed such as to extend between the pair of bead portions 1. Steel cord, organic fiber such as polyester, rayon, nylon and aramido is preferably used as the ply cord. An end of the carcass ply 5 is curled up outward such as to sandwich the bead 6 and a bead filler 7.

An inner liner layer 8 is disposed on the carcass ply 5 on an inner peripheral side for keeping air pressure. A belt layer 9 is disposed on the carcass ply 5 on an outer peripheral side of the tire. The belt layer 9 comprising two belt plies which are laminated together in and out. The belt layer 9 reinforces the tire by means of hoop effect. Each belt ply comprises steel cords extending such as to be inclined at predetermined angle with respect to the circumferential direction of the tire, and the steel cords are disposed such as to intersect with each other in opposite directions between the plies. The material of the belt ply is not limited to the steel cords, and organic fiber such as polyester, rayon, nylon and aramido may also be employed. A reinforcing layer is disposed on the belt layer 9 on the outer peripheral side of the tire if necessary.

Figure 3:
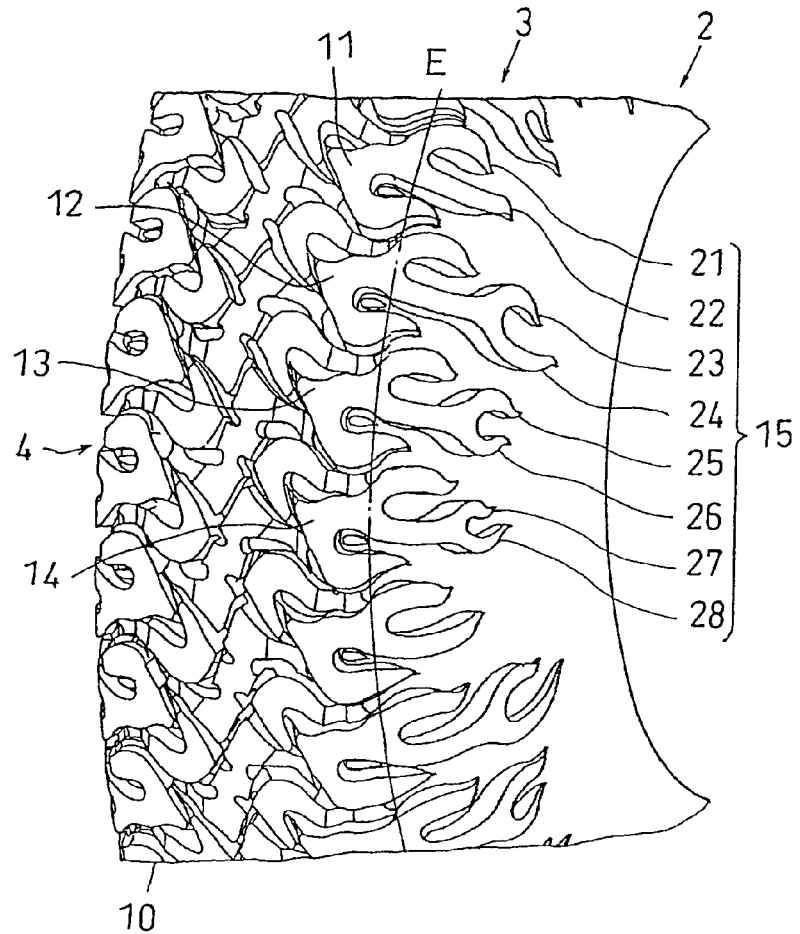
FIG. 3 is a perspective view of the pneumatic tire of the invention.

Examples of raw material rubbers for the rubber layer and the like are natural rubber, styrene-butadiene rubber (SBR), butadiene rubber (BR), isoprene rubber (IR), butyl rubber (IIR) and the like. These rubbers are used alone or a combination thereof. These rubbers are reinforced using filler such as carbon black and silica, and cure, accelerator, plasticizer, antioxidant or the like is appropriately mixed A tread surface 10 is formed with a tread pattern, and is provided with a plurality of blocks. In this embodiment, as shown in FIGS. 2 and 3, extension blocks 11 to 14 are disposed outside of the tread portion 4 in the widthwise direction, and the extension blocks 11 to 14 extends from the shoulder portion 3 to the sidewall portion 2 beyond a tread edge E. The extension blocks 11 to 14 are branched and extended from the shoulder portion 3 toward the sidewall portion 2. For the sake of convenience of explanation, portions of the extension blocks 11 to 14 from finally branched portions to their tip ends are called extension blocks 21 to 28, respectively.

Figure 4:
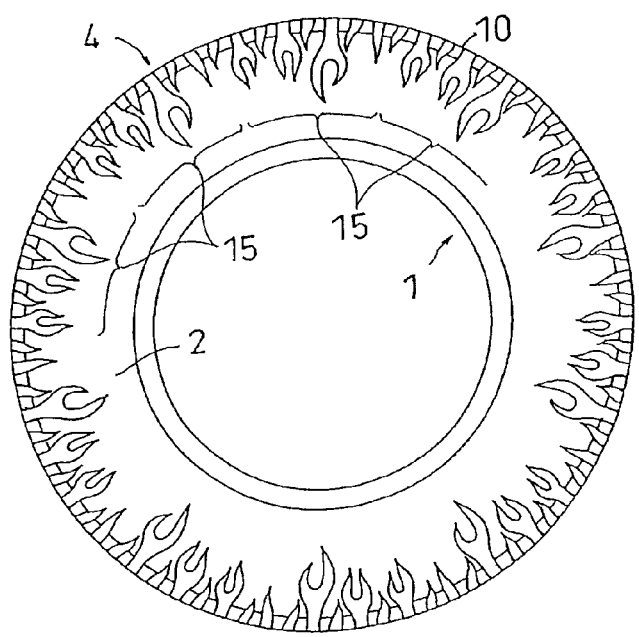
FIG. 4 is a side view of the pneumatic tire of the invention.
Figure 5:
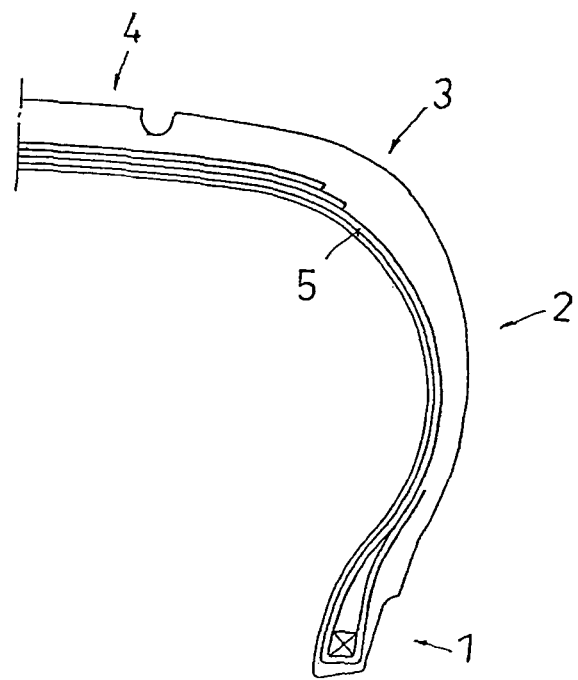
FIG. 5 is a semi-sectional view showing an example of a conventional pneumatic tire

Each of extension block groups 15 comprises the extension blocks 21 to 28. In this embodiment, as shown in FIG. 4, each of the extension block groups 15 is continuously formed along the circumferential direction of the tire, but a region where the extension block group 15 is not formed may be provided. The extension blocks 21 to 28 constituting the extension block group 15 may not be arranged at equal distances from one another.

The extension blocks 21 to 28 are arranged in the circumferential direction of the tire such that cross section heights thereof from the tire equator point CP are different from one another. Here, the tire equator point CP is an intersection between the tire equator C and the tread contour in the tire meridian cross section, and when a groove is formed on the tire equator C, a tread contour when the groove is filled is used. Of the extension blocks constituting the extension block group 15, the extension block 24 has the highest cross section height from the tire equator point CP, and the extension block 24 corresponds to the longest block. As can be found from FIG. 1, cross section height h1 of the extension block 24 as measured from the tire equator point CP is more than ½ of the tire cross section height H, and the extension block 24 also corresponds to the first extension block. The second extension block is determined relative to the relation with respect to other extension blocks, but if the extension block 24 is supposed to be the first extension block, remaining extension blocks 21 to 23 and 25 to 28 correspond to the second extension blocks.

Since the extension block group 15 has the extension block 24, the extension block group 15 exceeds ½ of the tire cross section height H from the tire equator point CP and reinforces the thin portion of the sidewall portion 2, and can reinforce the sidewall portion 2 over the substantially entire region of the cross section height. In this embodiment, the cross section height h1 of the extension block 24 from the tire equator point CP reaches a height of the tip end of the bead filler 7 and with this, the sidewall portion 2 can be reinforced more effectively. The extension block 24 is tapered and its tip end does not have excessively high rigidity in a region where the bead filler 7 is superposed with the tip end in the thickness direction of the tire.

As described above, the extension blocks 21 to 28 constituting the extension block group 15 have different cross section heights from the tire equator point CP, and the interface of the reinforced region is inclined in the circumferential direction of the tire. Thus, a crack caused by distortion when the sidewall portion 2 is bent can be suppressed, and the durability can be enhanced effectively. Since the extension block group 15 comprises the plurality of extension blocks 21 to 28 having different cross section heights, it is possible to suppress vibration in the direction of the cross section height of relatively wide frequency band from low frequency to high frequency, and the road noise can effectively be reduced.

To obtain the above-described effect, it is preferable that the extension blocks constituting the extension block group 15 includes both the extension block having the cross section height from the tire equator point CP which exceeds ½ of the tire cross section height H and the extension block having the cross section height from the tire equator point CP which does not exceed ½ of the tire cross section height H. The extension blocks constituting the extension block group 15 may include the same cross section heights but it is preferable that such extension blocks are not adjacent to each other.

It is preferable that land heights of the extension blocks 21 to 28 constituting the extension block group 15 are gradually reduced from the shoulder portion 3 toward the sidewall portion 2 like the extension block 24 shown in FIG. 1. With this, rigidity difference in the interface of the reinforced region can be reduced, and durability and steering stability can effectively be enhanced.

It is preferable that a ratio of cross section height of the extension blocks 21 to 23 and 25 to 28 from an intersection point P between the tire surface and a contour extension line L at the radius of curvature R which appears on a groove bottom surface of the tread portion 4 to a cross section height h2 of the extension block 24 which is the longest block from the intersection point P is 20% or more. With this, the reinforcing effect of the sidewall portion 2 obtained by the extension blocks 21 to 23 and 25 to 28 can be secured.

The cross section height of the extension block and the tire cross section height H are measured in a state in which a pneumatic tire is mounted on a regular rim, regular internal pressure is charged into the pneumatic tire, and no load is applied. Here, regular rim is a standard rim defined in JATMA in correspondence with tire size. The regular internal pressure is maximum air pressure based on JATMA, but when the tire is for a passenger vehicle, the regular internal pressure is 180 KPa.

According to the pneumatic tire of the present invention, it is only necessary to provide a tire mold with recesses for forming the extension block groups 15, and other producing procedure of the tire is the same as that of the conventional procedure.

[Another Mode]

The tread portion formed in the pneumatic tire of the present invention is not limited to the embodiment. For example, the extension blocks constituting the extension block group may extend without branching off, or may incline with respect to a radial direction of the tire. The extension block need not be tapered, and may spread toward its tip end.

EXAMPLES

An example tire which concretely shows the structure and effect of the present invention will be explained.

Durability

A test of regular time was carried out with a regular load in conformity with conditions as durability test in Federal Motor Vehicle Safety Standard FMVSS109, and running time required until a trouble was found in the sidewall portion was measured. When no trouble was found, drum running was continued with 140% load, and the running time was measured until trouble was found. Results are shown with indices while showing a comparative example 1 as 100. As the numerical value is greater, the running time is longer, i.e., durability is more excellent.

Steering Stability and Noise Reduction Ability

Tires were assembled to rims of a vehicle (5.6 L truck for export, two passengers rode therein) having wheel size of 17×9.5JJ, the vehicle was allowed to run on an excellent road and a poor road, and sensory evaluation was made by feeling test. In the feeling test, the passengers were not informed of kinds of test tires, the vehicle run with internal pressure of 200 kPa, and the passengers evaluated. Results are shown with indices while showing the comparative example 1 as 100. As the numerical value is greater, the steering stability and noise reduction ability are more excellent.

Comparative Example 1

A pneumatic tire (tire size: LT285/70R17) formed with no blocks extending from the shoulder portion to the sidewall portion was produced as the comparative example 1.

Comparative Example 2

A pneumatic tire (tire size: LT285/70R17) formed with no blocks extending from the shoulder portion to the sidewall portion but formed with a plurality of rims extending from a portion in the vicinity of the shoulder portion to a lower region of the sidewall portion in the circumferential direction of the tire was produced as the comparative example 2. The rims are not extended from the shoulder portion to the sidewall portion but have discontinuous portion.

Comparative Example 3

A pneumatic tire (tire size: LT285/70R17) formed with blocks extending from the shoulder portion to the sidewall portion was produced as the comparative example 3. The cross section heights of the extension blocks from the tire equator point are ½ of the tire cross section height.

Example Tire Of The Present Invention

The pneumatic tire (tire size: LT285/70R17) shown in the embodiment in which extension blocks extending from the shoulder portion to the sidewall portion and cross section heights of the extension blocks from the tire equator point are different from each other was prepared as the example tire of the invention. Lengths of the extension blocks 21 to 28 are 26.92, 31.82, 59.52, 71.22, 74.12, 80.92, 93.62, 123.61 (unit is mm) in the increasing order of the cross section height from an intersection point P. Results of the evaluation are shown in Table 1.

TABLE 1

|  | Comparative example 1 | Comparative example 2 | Comparative example 3 | Example tire of the present invention |
|---|---|---|---|---|
| Durability | 100 | 120 | 115 | 125 |
| Steering stability | 100 | 105 | 105 | 110 |
| Noise reduction ability | 100 | 105 | 105 | 110 |

According to the results shown in Table 1, it can be found that the example tire of the present invention has most excellent durability, steering stability and noise reduction ability, the sidewall portion is effectively reinforced by the extension block group, and the noise reduction ability is enhanced. Concerning the comparative example 1, since the sidewall portion is not reinforced, the numeric value in each item is the lowest. In the comparative example 2, it is conceived that the strength was deteriorated in the discontinuous portion. In the comparative example 3, it is conceived that strength was deteriorated in the thin portion of the sidewall portion exceeding ½ of the tire cross section height of the sidewall portion. In the comparative examples 2 and 3, it is conceived that since the cross section heights of the rims or the extension blocks from the tire equator point are the same, frequency band of vibration to be suppressed is relatively narrow, and the road noise reduction efficiency was poor.

What is claimed is:

1. A pneumatic tire comprising:
   a pair of bead portions;
   sidewall portions extending from the respective bead portions outward in a radial direction of the tire;
   a shoulder portion;
   a tread portion connected to an outer side of the sidewall portion in the radial direction of the tire via the shoulder portion; and
   an extension block group comprised of a plurality of extension blocks comprising first, second, and third extension blocks extending from at least the shoulder portion to the sidewall portion,
   said first extension block having a cross section height h1 exceeding ½ of a tire cross section height H measured from a tire equator point CP which is an intersection point between a tread contour of the tread portion and a tire equator C defined in a tire meridian cross section,
   said second extension block having a cross section height from the equator point CP which is lower than the cross section height of the first extension block,
   said third extension block having a cross section height from the tire equator point CP which is lower than the cross section height of the first extension block, and greater than the cross section height of the second extension block,
   wherein ends of the first, second, and third extension blocks extending toward respective bead portions are branched, and
   wherein a land height of each of the extension blocks disposed in the shoulder portion is gradually reduced to the sidewall portion.

2. The pneumatic tire according to claim 1, wherein tip ends of each of the extension blocks extending toward respective bead portions are tapered with respect to a radial direction.

3. The pneumatic tire according to claim 1, wherein the extension blocks are arranged such that adjacent extension blocks have different cross section heights measured from the tire equator point CP.

4. The pneumatic tire according to claim 1, wherein the first extension block extends to a vicinity of the bead portion.

5. A pneumatic tire comprising a pair of bead portions, sidewall portions extending from the respective bead portions outward in a radial direction of the tire, a tread portion connected to an outer side of each of sidewall portions in the radial direction of the tire through a shoulder portion, and extension block groups in each of which a plurality of extension blocks extending from at least the shoulder portion to the sidewall portion are arranged in a circumferential direction of the tire,
   wherein each of extension block groups includes at least:
   a first extension block whose cross section height from a tire equator point exceeds ½ of a tire cross section height,
   a second extension block whose cross section height from the tire equator point does not exceed ½ of a tire cross section height,
   a third extension block whose cross section height from the tire equator point is lower than the cross section height of the first extension block, and greater than the cross section height of the second extension block,
   wherein ends of the first, second, and third extension blocks extending toward the respective bead portions are branched, and
   wherein a land height of each of the extension blocks constituting the extension block group is gradually reduced from the shoulder portion to the sidewall portion.

6. The pneumatic tire according to claim 5, wherein, when one of the extension blocks constituting the extension block group which has the highest cross section height from the tire equator point is defined as a longest block, and
   a ratio of a cross section height of the second extension block from an intersection point between a tire surface and a contour extension line at the radius of curvature which appears on a groove bottom surface of the tread portion to a tip end of the second extension block with respect to a cross section height of the longest block from the intersection point to a tip end of the longest block is 20% or more.

7. The pneumatic tire according to claim 5, wherein a tip end of each extension block constituting each of the extension block groups is tapered.

8. The pneumatic tire according to claim 1, wherein a cross section height of the second extension block from an intersection point P between a tire surface and a contour extension line L at a radius of curvature which appears on a groove bottom surface of the tread portion to a tip end of the second extension block is at least 20% of a highest cross section height h2 of the first extension block from the intersection point P to a tip end of the first extension block.

* * * * *